US007727667B2

(12) United States Patent  (10) Patent No.: US 7,727,667 B2
Sakurai  (45) Date of Patent: Jun. 1, 2010

(54) ACCUMULATOR DEVICE

(75) Inventor: Masato Sakurai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1302 days.

(21) Appl. No.: 11/075,175

(22) Filed: Mar. 7, 2005

(65) Prior Publication Data

US 2005/0208375 A1 Sep. 22, 2005

(30) Foreign Application Priority Data

Mar. 18, 2004 (JP) ............................. 2004-077638

(51) Int. Cl.
*H01M 10/00* (2006.01)
*H01M 10/38* (2006.01)
*H01M 2/14* (2006.01)
*H01M 6/42* (2006.01)
*H10M 6/46* (2006.01)

(52) U.S. Cl. ................... 429/122; 429/123; 429/129; 429/131; 429/149; 429/151; 429/152; 429/153

(58) Field of Classification Search .................. 429/34, 429/97, 122, 123, 129, 131, 149, 151, 153, 429/152
See application file for complete search history.

(56) References Cited

U.S. PATENT DOCUMENTS 6,086,643 A * 7/2000 Clark et al. ................ 29/623.2
2001/0046618 A1* 11/2001 Okazaki et al. ............. 429/26

FOREIGN PATENT DOCUMENTS

| CN | 2519420 | 10/2002 |
|---|---|---|
| JP | 02037666 | 2/1990 |
| JP | 2003-157813 A | 5/2003 |

* cited by examiner

*Primary Examiner*—Patrick Ryan
*Assistant Examiner*—Helen O Conley
(74) *Attorney, Agent, or Firm*—McDermott Will & Emery LLP

(57) ABSTRACT

A package case is structured by a plurality of substantially identical and flat frames stacked on one another. Flat laminate cells (accumulator cells) are individually accommodated in the frames and stacked on one another, so that the number of flat laminate cells (accumulator cells) can readily be changed simply by increasing/decreasing the number of frames to be stacked to meet energy needs and the like. The accumulator device is segmented using the plurality of flat frames, so that externally applied impacts can readily be dispersed and the impact transmitted to the flat laminate cells (accumulator cells) can be reduced without reinforcing the accumulator device 1 with more than necessary strength.

11 Claims, 14 Drawing Sheets

ACCUMULATOR DEVICE

This application claims foreign priority based on Japanese patent application No. JP-2004-077638, filed on Mar. 18, 2004, the contents of which is incorporated herein by reference.

BACKGROUND OF THE INVENTION

The present invention relates to an accumulator device including a plurality of connected accumulator cells such as a rechargeable battery, a capacitor, and a generator module.

As an accumulator device for a vehicle such as an electric vehicle (EV), a hybrid electric vehicle (HEV), and a fuel-cell vehicle (FCV), a battery pack which is relatively easy to handle and structured by connecting a plurality of small sized accumulator cells (such as a rechargeable battery, a capacitor, and a generator module) is extensively used.

A main part of the accumulator device (battery pack) of this kind is generally structured by integrally accommodating a predetermined number of accumulator cells (element cells) set depending on voltage and capacity specifications in a package case. (see JP-A-2003-157813).

However, in the prior art as described above that the accumulator device is structured by integrally accommodating a number of accumulator cells in a package case, dedicated package cases must be individually prepared for each specification (e.g. the number of accumulator cells to be accommodated) of a vehicle or the like for mounting the accumulator device thereto on the basis of energy needs of the vehicle. Furthermore, new cases will be necessary every time the specification of the vehicle is changed.

Further, the package case for integrally accommodating the plurality of accumulator cells as described above must have strength over a prescribed level in general so as to protect the accumulator cells from externally applied impacts or the like. However, on the contrary, when the strength of the package case is thus secured, the structure could be complicated or the weight could be increased.

SUMMARY OF THE INVENTION

The present invention has been made in consideration of the above described disadvantages, and it is an object of the present invention to provide an accumulator device that has a highly versatile and simple structure and can surely protect the accumulator cells from external impacts.

An accumulator device according to the invention comprises a plurality of substantially identical and flat frames. Each of the frames comprises: an accommodating portion for accommodating an accumulator cell; a first abutment portion on an adverse surface of each of the frames; a second abutment portion on a reverse surface of each of the frames; a first fitting structure on the first abutment portion; and a second fitting structure on the second abutment portion. The plurality of frames are stacked by contacting adjacent ones of the plurality of frames by the first abutment portion of one of the adjacent frames and the second abutment portion of another of the adjacent frames. The adjacent frames are commonly coupled by fitting the first fitting structure of the one of the adjacent frames to the second fitting structure of the another of the adjacent frames.

In the accumulator device, it is preferable that the accumulator cell accommodated in the accommodating portion of the one of the adjacent frames is held between the one of the adjacent frames and the another of the adjacent frames.

Moreover, the accumulator cell may be a laminate cell, and a sealing portion of the laminate cell positioned in the accommodating portion is between the first abutment portion of the one of the adjacent frames and the second abutment portion of the another of the adjacent frames.

Furthermore, it is preferable that the first abutment portion and the second abutment portion are made of an elastic member.

Moreover, the each of frames may further comprises a cooling passage structure, so that the cooling passage structures of the plurality of frames are connected to form a continuous cooling passage in a stacking direction of the frames when the plurality of frames are stacked.

Moreover, the first fitting structure may comprise a fitting projection provided to project at the first abutment portion near one side, and the second fitting structure may comprise a fitting recess provided at the second abutment portion near the other side.

Furthermore, it is preferable that a plurality of the accumulator cells are connected in series in advance, each of the plurality of accumulator cells is individually accommodated in the accommodating portions of each of the frames, and the plurality of accumulator cells are arranged in a zigzag arrangement with respect to each other.

Moreover, the first fitting structure and second fitting structure both comprise electrically conducting contacts, one electrode terminal of the accumulator cell is electrically connected to the first fitting structure, and the other electrode terminal is electrically connected to the second fitting structure, so that the accumulator cell and the frame constitute a module.

Moreover, the accumulator device may comprise a cover sheet for at least externally covering coupling portions between the frames, and for reinforcing the coupling portions.

Furthermore, it is preferable that the cover sheet is an annular heat-shrinkable sheet, and the cover sheet comprises intermittent incisions along the coupling portions or the vicinity of the coupling portions.

Moreover, the accumulator device may further comprise an accessory accommodating frame for accommodating an accessory, the accessory accommodating frame may have substantially the same shape as each of the frame, and the accessory accommodating frame may be stacked on the plurality frames that accommodates the accumulator cell.

The accumulator device according to the present invention has a highly versatile and simple structure and can surely protect the accumulator cells from external impacts.

DESCRIPTION OF THE PREFERRED EMBODIMENTS

Figure 1:
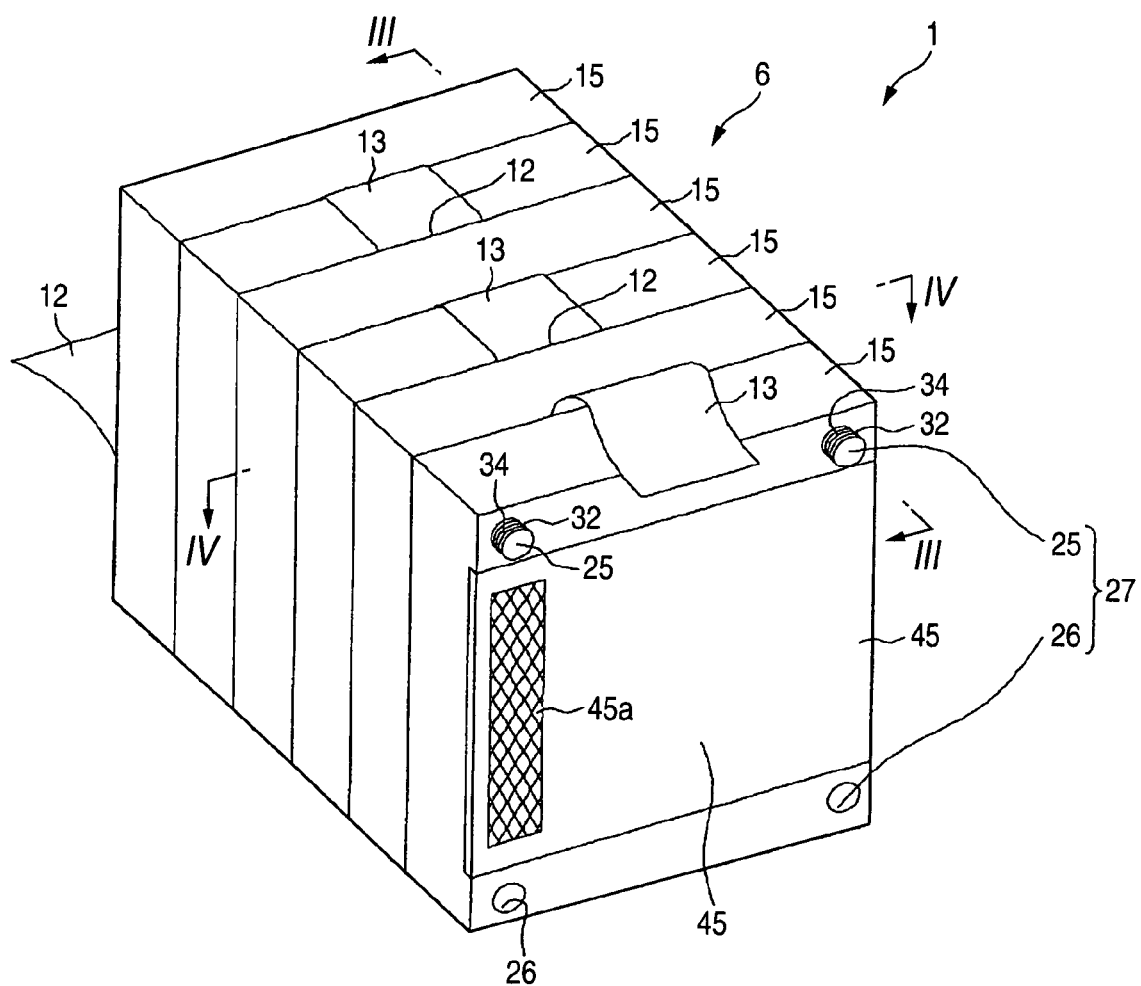
FIG. 1 is a perspective view of an accumulator device according to a first embodiment of the invention.
Figure 2:
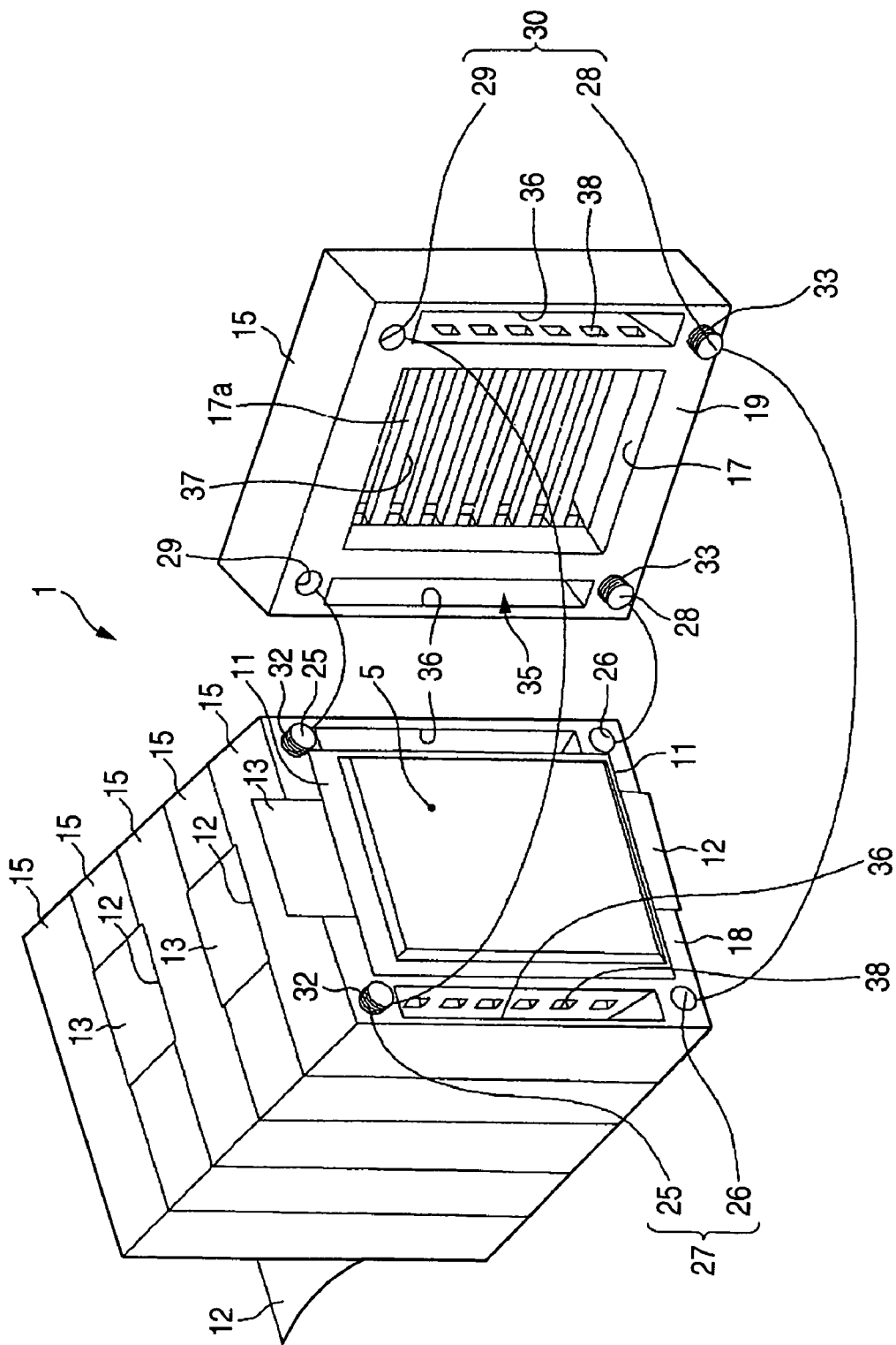
FIG. 2 is a partly exploded, perspective view of the accumulator device in FIG. 1 according to the first embodiment.
Figure 3:
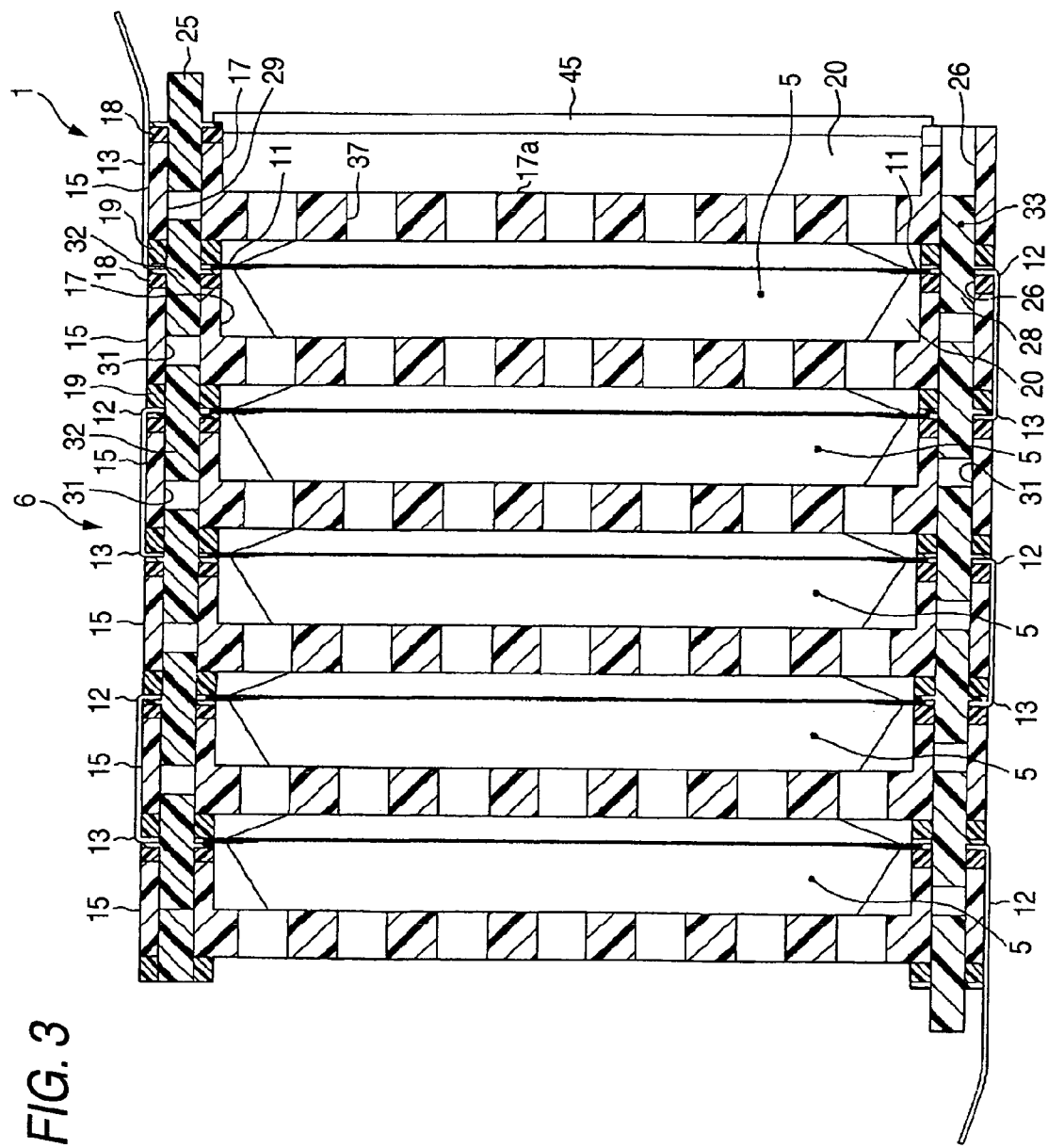
FIG. 3 is a sectional view taken along line III-III in FIG. 1 according to the first embodiment.
Figure 4:
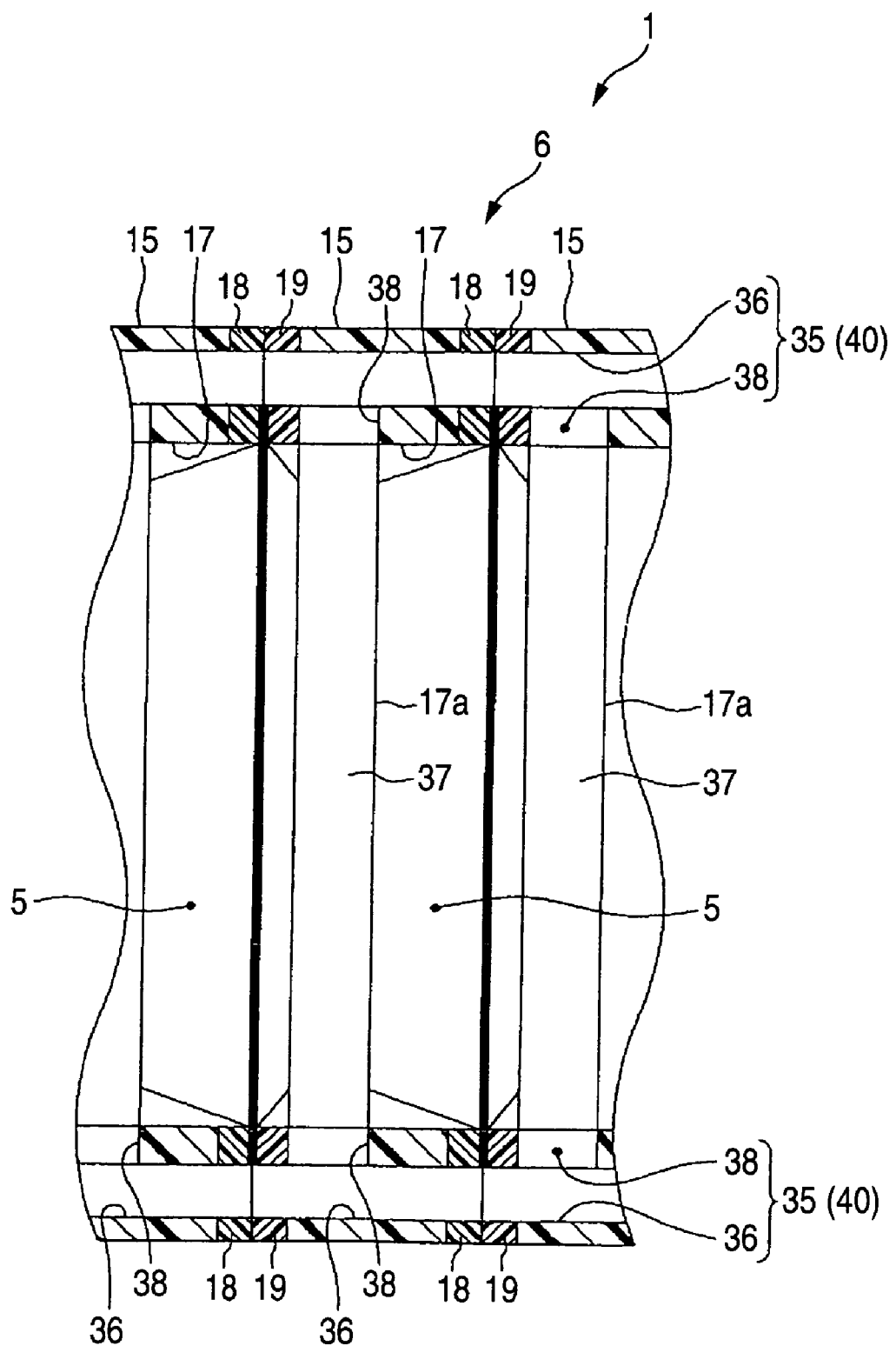
FIG. 4 is a sectional view taken along line IV-IV in FIG. 1 according to the first embodiment.
Figure 5:
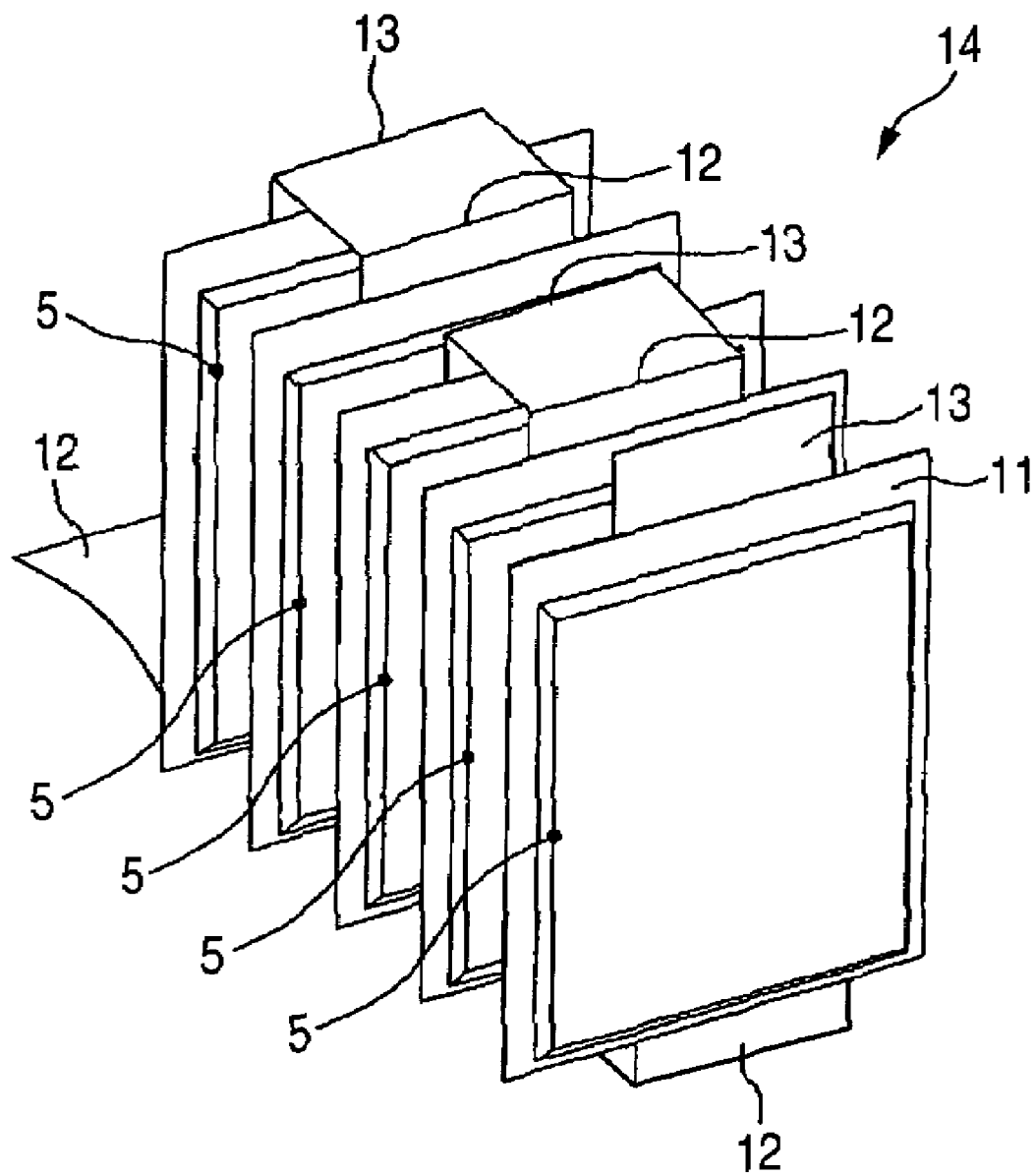
FIG. 5 is a perspective view of series-connected accumulator cells according to the first embodiment.

Hereinafter, preferred embodiments of the present invention will be described with reference to the accompanying drawings. FIGS. 1 to 5 relate to a first embodiment of the invention, and FIG. 1 is a perspective view of an accumulator device, FIG. 2 is a partly exploded, perspective view of the accumulator device in FIG. 1, FIG. 3 is a sectional view taken along line III-III in FIG. 1, FIG. 4 is a sectional view taken along line IV-IV in FIG. 1, and FIG. 5 is a perspective view of series-connected flat laminate cells.

In FIGS. 1 to 4, the reference numeral 1 represents an accumulator device mounted for example in an electric vehicle (EV), a hybrid electric vehicle (HEV), or a fuel cell vehicle (FCV), and the accumulator device 1 includes a plurality of (five in the shown example) flat laminate cells 5 as the accumulator cells, and a package case 6 that accommodates the flat laminate cells 5.

Note that a flat laminate cells 5 in a substantially rectangular shape in a plan view are used as the accumulator cells in the embodiment, while other kinds of rechargeable batteries, capacitors, a generator module or the like may be used instead. As is well known, the flat laminate cells 5 used in the embodiment have layers of electrodes and electrolyte enclosed and sealed with a laminate film. A sealing portion 11 is provided around it, and tabs 12 and 13 for positive and negative electrode terminals are provided on the ends.

Now, in the embodiment, the flat laminate cells 5 are connected in series in advance by connecting the tabs 12 and 13 as the terminals, and the series-connected flat laminate cells 5 constitute a continuous cell string 14 (see FIG. 5).

The package case 6 is essentially made of a plurality of (six in the shown example) substantially identical frames 15 stacked to each other.

As shown in FIGS. 3 and 4, the package case 6, for example, has flat frames 15 of resin in a substantially rectangular shape in a plan view, and there is an opening 17 having a bottom on one surface of the frame 15. An elastic member made of a materiel such as low-resilience resin and a urethane foam material is provided around the opening 17 and on both surfaces along the edges, and these elastic members serve as abutment portions 18 and 19 (a first abutment portion 18 and a second abutment portion 19) against the other frames 15. That is, the first abutment portion 18 is provided on a first surface (an adverse surface) of the frame 15, and the second abutment portion 19 is provided on a second surface (a reverse surface) of the frame 15. An accommodating portion 20 that accommodates the flat laminate cell 5 is formed in the frame 15 by the opening 17 of the frame 15.

The abutment portion 18 (the first abutment portion 18) of one frame 15 is, for example, provided with a first fitting structure 27 consisting of a pair of fitting projections 25 (a first fitting projections 25) and a pair of fitting recesses 26 (a first fitting recesses 26), and the abutment portion 19 (the second abutment portion 19) of the other frame is provided with a second fitting structure 30 corresponding to the first fitting structure 27 and consisting of a pair of fitting recesses 29 (a second fitting recesses 29) and a pair of fitting projections 28 (a second fitting projections 28), so that adjacent frames 15 stacked by contacting by the first abutment portion 18 of one of the adjacent frames 15 and the second abutment portion 19 of another of the adjacent frames 15 are coupled by fitting the first fitting structure 27 of the one of the adjacent frames 15 and the second fitting structure 30 of the another of the adjacent frames 15. (see FIGS. 2 and 3).

More specifically, at the four corners of the frame 15, through holes 31 through the frame 15 and the abutment portions 18 and 19 are provided. Using these through holes 31, the first and second fitting structures 27 and 30 are formed.

Furthermore specifically, in the through holes 31 formed in the first abutment portion 18 near one end in the longitudinal direction of the frame 15 (e.g. an upper end), pins 32 are respectively implanted and fixed to the through holes 31. One end of each of the pins 32 on the side of the second abutment portion 19 is protruded from the corresponding through hole 31, and the one end of each of the pins 32 is provided as the first fitting projection 25. Each of the through holes 31 formed in the first abutment portion 18 near the other end in the longitudinal direction of the frame 15 (e.g. a lower end) is provided as the first fitting recess 26.

Similarly, on the second abutment portion 19, in the through holes 31 formed in the second abutment portion 19 near the other end (lower end) in the longitudinal direction of the frame 15, pins 33 are respectively implanted and fixed to the through holes 31. One end of each of the pins 33 on the side of the first abutment portion 18 is protruded from the corresponding through hole 31, and the one end of each of the pins 33 is provided as the second fitting projection 28. Each of the through holes 31 formed in the second abutment portion 19 near the one end (upper end) in the longitudinal direction of the frame 15 is provided as the second fitting recess 29.

Now, as shown in FIG. 2, a plurality of engagement grooves 34 are provided on the periphery of each of the fitting projections 25 (28), and the engagement grooves 34 function as a falling-out stopper (a retaining stopper) having prescribed strength between the fitting projections 25 (28) and the fitting recesses 26 (29). In other words, a so-called semi-locking structure is formed between the fitting projections 25 (28) and the fitting recesses 26 (29).

As shown in FIGS. 2 and 4, the frames 15 each have a cooling passage structure 35 for cooling the flat laminate cells 5 as the accumulator cells accommodated in the accommodating portion 20. The cooling passage structure 35 has for example a pair of through portions 36 penetrating through the edge parts on both shorter side direction of the frame 15, a plurality of slits 37 provided at the bottom 17a of the opening 17, and a communication opening 38 to allow the through portions 36 and slits 37 to communicate with each other. The cooling passage structures 35 are connected to form a cooling passage 40 connected in a stacking direction in the package case 6 when the frames 15 are stacked. More specifically, cooling air is passed through the cooling passage structures 35, so that the flat laminate cells 5 accommodated in the frames 15 can be cooled. Note that, if a water proof arrangement is provided, a liquid cooling method with a liquid such as water may be used instead of the cooling air.

Among the frames 15 (for example six frames 15) structured as described above, in the accommodating portions 20 of the frames 15 as many as the number (for example five) of the flat laminate cells 5 in the cell string 14, the flat laminate cells 5 are individually accommodated. The frames 15 accommodating the flat laminate cells 5 are sequentially stacked on one another by contacting adjacent ones of the frames 15 by the first abutment portion 18 of one of the adjacent frames 15 and the second abutment portion 19 of another of the adjacent frames 15, and the adjacent frames 15 are commonly coupled by fitting the first fitting structure 27 of the one of the adjacent frames 15 to the second fitting structure 30 of the another of the adjacent frames 15 (as the first fitting projections 25 and the second fitting recesses 29 and the second fitting projections 28 and the first fitting recesses 26 are fitted with each other)(see FIG. 2).

To one end of a stacking of the frames 15 respectively accommodating the flat laminate cells 5, another frame 15 (with no flat laminate cell 5 accommodated) is further stacked and coupled, and the accommodating portion 20 of the another frame 15 is closed by a cover 45 (see FIGS. 1 and 3). Note that, the reference character 45a refers to a cooling air inlet 45a opened corresponding to the cooling passage 40 so as to let cooling air into the cooling passage 40 formed in the package case 6.

By a stacking and coupling structure of these frames 15, the cell string 14 is accommodated in the package case 6 in a manner that the flat laminate cells 5 are arranged in a zigzag arrangement.

At the time, as shown in FIG. 3, a flat laminate cell 5 accommodated in an accommodating portion 20 is held between a frame 15 and the adjacent frame 15 stacked thereon. More specifically, the frame 15 according to the embodiment is provided so that the total of the depth of the opening 17 and the thickness of the abutment portions 18 and 19 is substantially in coincidence with the thickness of the accumulator cell 5, and the slits 37 forming the bottom 17a of the opening 17 hold the flat laminate cell 5. As shown in FIGS. 3 and 4, the sealing portion 11 for the flat laminate cell 5 accommodated in the accommodating portion 20 is held between the abutment portion 18 of a frame 15 and the abutment portion 19 of the adjacent frame 15 stacked thereon.

In this case, the abutment portions 18 and 19 are made of an elastic member, so that the flat laminate cells 5 are held elastically in a closely contacted manner between the frames 15, and the sealing portions 11 are also held elastically in a closely contacted manner between the abutment portions 18 and 19. In this way, a contact pressure can be surely loaded to each of the electrodes in the flat laminate cells 5.

According to the embodiment, the package case 6 is constituted by a stacking structure of the plurality of substantially identical frames 15, so that the versatility of the accumulator device 1 can be improved. More specifically, simply by increasing/decreasing the number of frames 15 to be stacked to meet energy needs such as voltage and power requirements, the number of flat laminate cells 5 that can be accommodated in the package case 6 can readily be changed. Therefore, different package cases are not necessary depending on the specifications of vehicles to which the cells are applied, and accumulator devices corresponding to various specifications can readily be provided.

Using the plurality of flat frames 15, the package case 6 is segmented, so that the flat laminate cells (accumulator cells) 5 can surely be protected from external impacts in a simple structure, and no more reinforcement are required. More specifically, upon application of a prescribed impact on the accumulator device 1, the semi-locking structure between the frames 15 consisting of the first and second fitting structures 27 and 30 is unlocked and the impact is dispersed. Therefore, such an impact transmitted to the flat laminate cells (accumulator cells) 5 can be reduced without strengthening a whole of the package case 6 more than necessary.

At the time of assembling the accumulator device 1, the flat laminate cells 5 connected in series by connecting the tabs 12 and 13 and arranged in a zigzag arrangement with respect to each other are accommodated in the frames 15. Therefore, a tab (electrode terminal) connecting process, which is cumbersome, is not necessarily carried out, even though each of the flat laminate cells 5 is individually accommodated in the respective frames 15. Moreover, an interconnection process in the accumulator device 1 can rationally be carried out.

Figure 6:
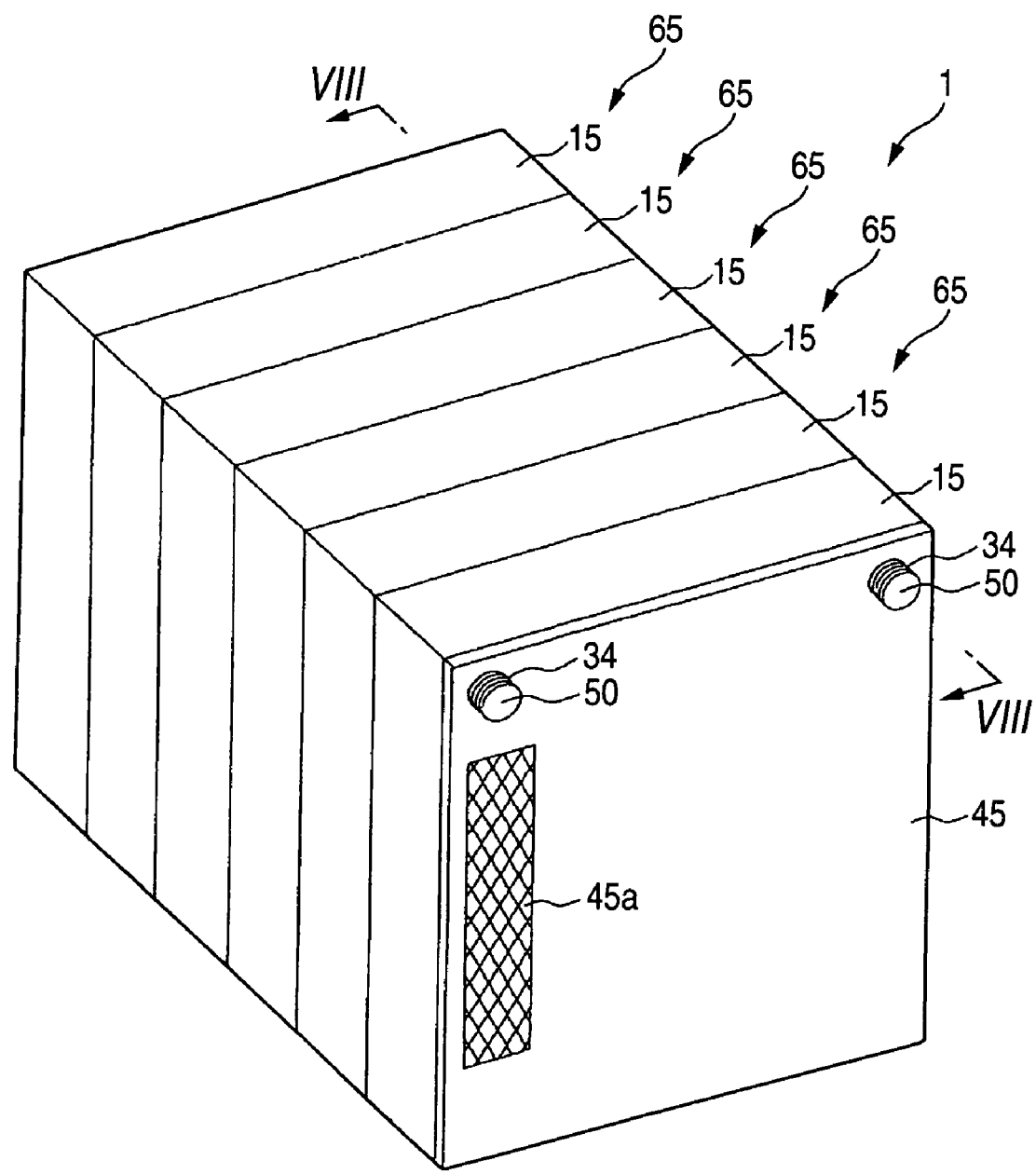
FIG. 6 is a perspective view of an accumulator device according to a second embodiment of the invention.
Figure 7:
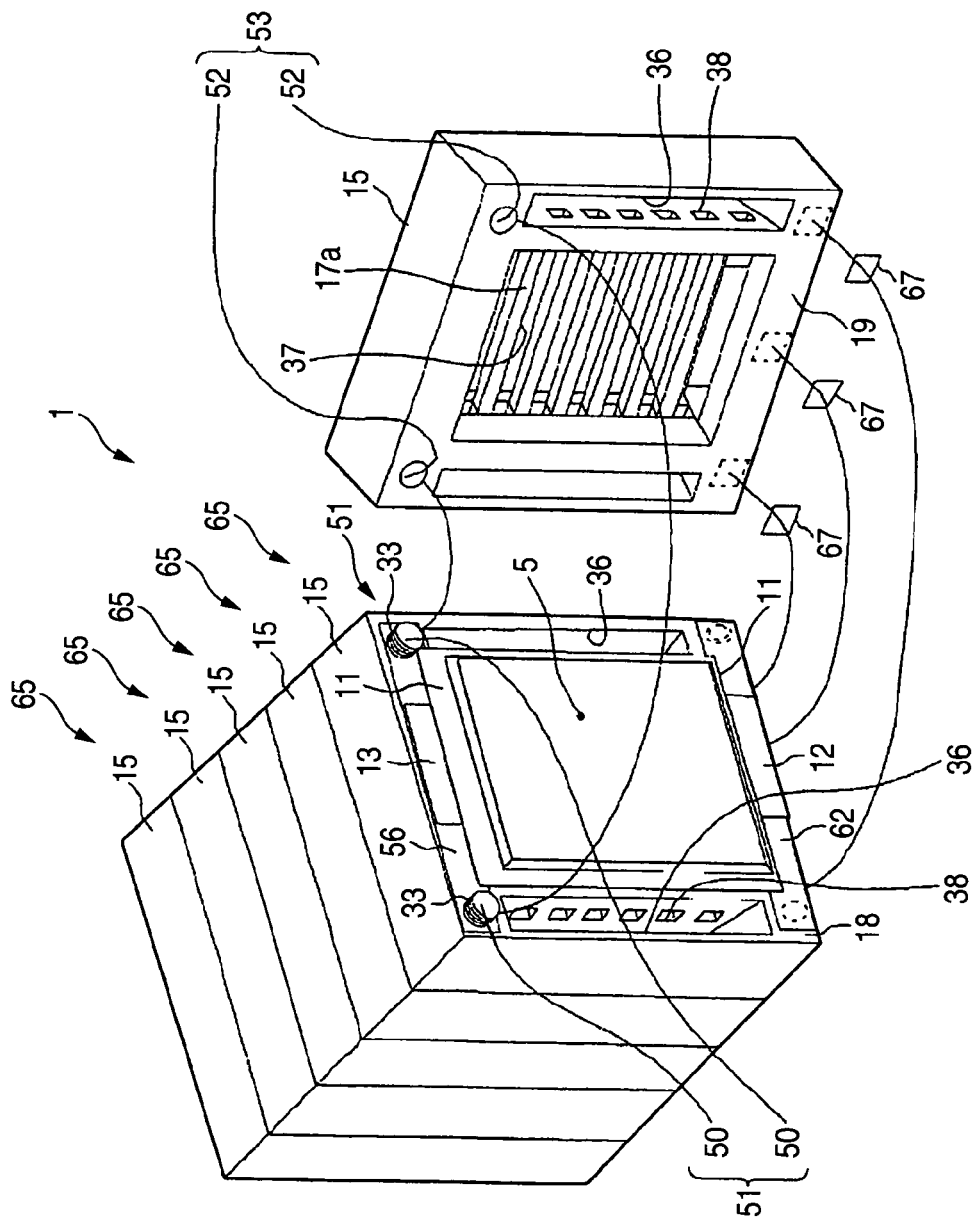
FIG. 7 is a partly exploded, perspective view of the accumulator device according to the second embodiment.
Figure 8:
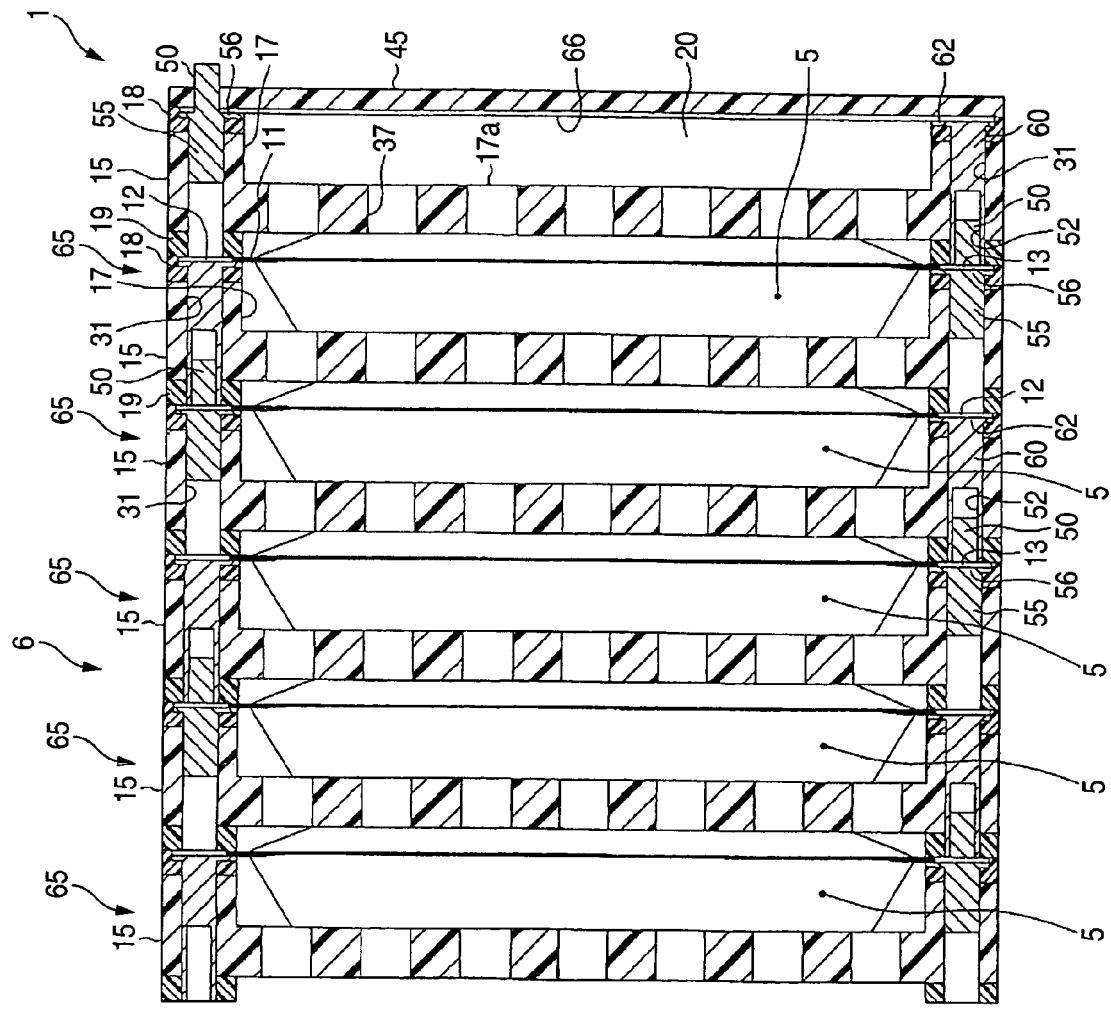
FIG. 8 is a sectional view taken along line VIII-VIII in FIG. 6 according to the second embodiment.
Figure 9:
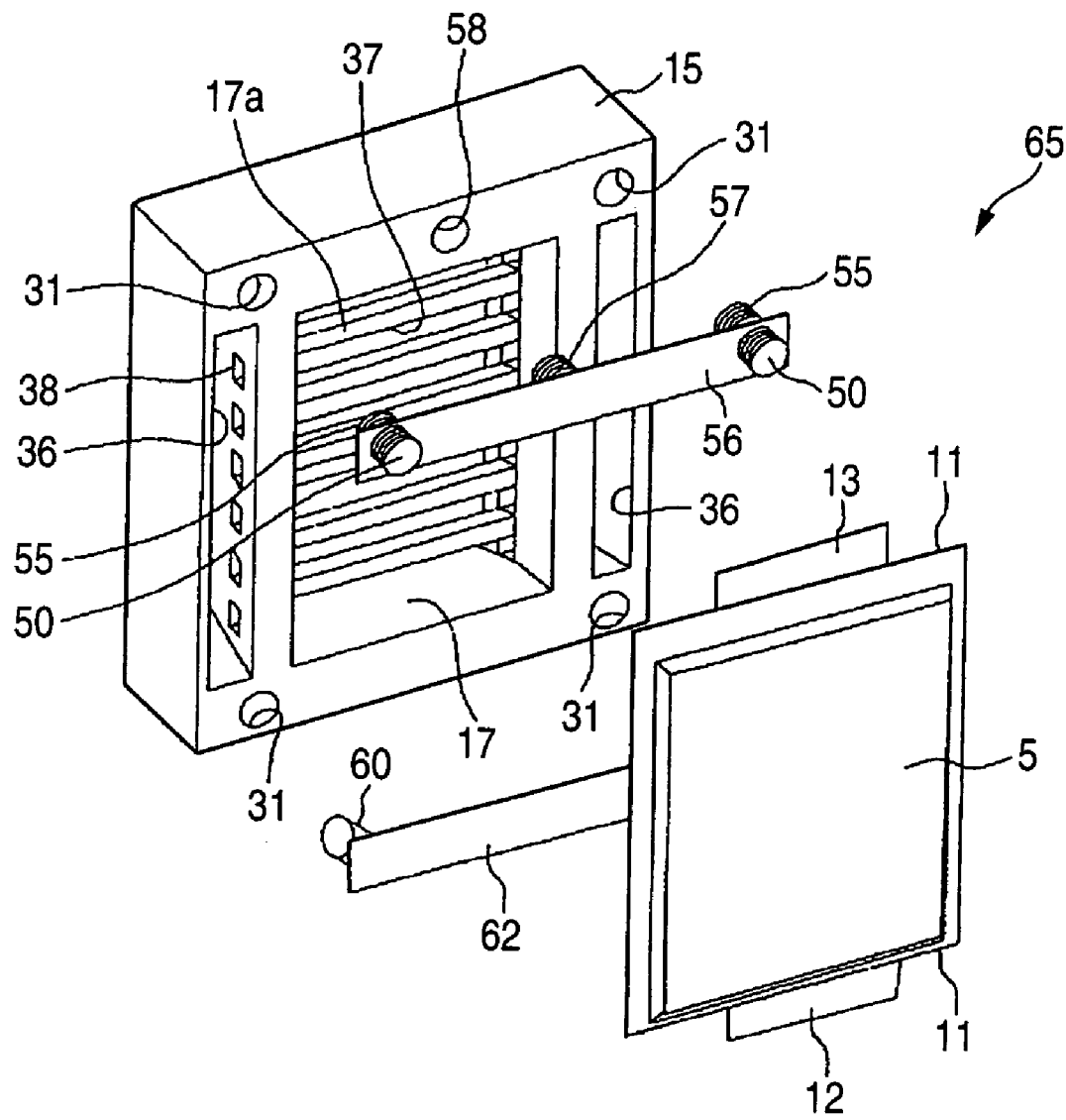
FIG. 9 is an exploded perspective view of a module according to the second embodiment.

Now, a second embodiment of the invention will be described. FIGS. 6 to 9 relate to the second embodiment of the invention. FIG. 6 is a perspective view of an accumulator device, FIG. 7 is a partly exploded, perspective view of the accumulator device, FIG. 8 is a sectional view taken along line VIII-VIII in FIG. 6, and FIG. 9 is an exploded perspective view of a module. Note that the second embodiment is mainly different from the first embodiment in the structures of first and second fitting structures. The other same parts will be denoted by the same reference characters and will not be described.

In the embodiment, the first abutment portion 18 comprises, for example, a first fitting structure 51 consisting of a pair of fitting projections 50, and the second abutment portion 19 comprises a second fitting structure 53 corresponding to the first fitting structure 51 and consisting of a pair of fitting recesses 52 (see FIGS. 7 to 9).

More specifically, at the four corners of the frame 15, through holes 31 penetrating through the abutment portions 18 and 19 are formed, and these through holes 31 are used to form the first and second fitting structures 51 and 53.

Further, in the first abutment portion 18, metal pins 55 having good conductivity are respectively implanted and fixed to the through holes 31 provided near one end in the longitudinal direction of the frame 15. Each one end of the pins 55 on the side of the first abutment portion 18 is protruded from each of the through holes 31, and the protruded pins 55 are provided to serve as the fitting projections 50.

In the first abutment portion 18, metal pins 60 having good conductivity are respectively implanted and fixed to the through holes 31 provided near the other end in the longitudinal direction of the frame 15. Each of the metal pins 60 penetrates the frame 15 so that one end of the each of the metal pins 60 is reached to a side of the second abutment portion 19 in each of the through holes 31. In the each of the through holes 31, at the one end of the each of pins 60 on the side of the second abutment portion 19, a recess corresponding to the fitting projection 50 is provided, and each recesses of the each of the pins 60 is provided to serve as a fitting recess 52.

A bus bar 56 is provided along the first abutment portion 18 between the pair of pins 55. A pin 57 is protruded from one surface of the bus bar 56 facing the first abutment portion 18, and the pin 57 is fitted into a hole 58 provided in the frame 15, so that the bus bar 56 can firmly be held at the frame 15. A bus bar 62 is provided along the abutment portion 18 between the pair of pins 60.

Among the frames 15 (for example six frames 15) structured as described above, in the accommodating portions 20 of the frames 15 as many as the number (for example five) corresponding to the flat laminate cells 5, the flat laminate cells 5 are individually accommodated. Each of the flat laminate cells 5 in the accommodating portions 20 has one tab (for example positive electrode) 12 connected to a bus bar 62 and the other tab (for example negative electrode) 13 connected to the bus bar 56. As the tabs 12 and 13 are connected, the flat laminate cell 5 is fixed in the frame 15 and forms a module 65 together with the frame 15. At the time, the electrical connection of the tab 12 with the bus bar 62 allows the fitting recess 52 to serve as a positive electrode contact (electrical conducting contact) and the electrical connection of the tab 13 with the bus bar 56 allows the fitting projection 50 to serve as a negative electrode contact (electrical conducting contact).

The frames 15 forming the modules 65 are sequentially stacked by contacting the first abutment portion 18 of one of adjacent frames 15 and the second abutment portion 19 of another of the adjacent frames 15, in a manner that the fitting projections 50 are alternately arranged. That is, when one of the fitting projections 50 of the one of the adjacent frames 15 is positioned near an upper end in the longitudinal direction of the one of the adjacent frames 15, another of the fitting projections 50 of the another of the adjacent frames 15 is positioned near a lower end in the longitudinal direction of the another of the adjacent frames 15. Thereby, each fitting projection 50 is opposed to the fitting recess 52 of adjacent frame 15 thereof, and as they are fitted with each other (as the first and second fitting structures 51 and 53 are fitted with each other), the frames 15 (modules 65) are coupled with each other. At the time, the flat laminate cells 5 are connected in series as the fitting projections 50 and the fitting recesses 52 are fitted with each other.

On a remaining frame 15 (with no flat laminate cell 5 accommodated), a bus bar 66 that connects the bus bar 56 and the bus bar 62 is provided (see FIG. 8). The remaining frame 15 is stacked and coupled to one end of a stacking of the modules 65 and the accommodating portion 20 of the remaining frame 15 is closed by a cover 45 (see FIGS. 6 and 8).

When the frames 15 are coupled as described above, a double-faced adhesive tape 67 is inserted between the first abutment portion 18 near the another end in the longitudinal direction of the one of the adjacent frames 15 and the second abutment portion 19 near the one end in the longitudinal direction of the another of the adjacent frames 15. Therefore, the double-faced adhesive tape 67 reinforces a coupling of the frames by the first fitting structure 51 and the second fitting structure 57 (see FIG. 7).

In the accumulator device 1 structured by coupling the frames 15, the fitting projections 50 and the fitting recesses 52 positioned on both ends serve as the negative electrode contact and the positive electrode contact, respectively for the accumulator device 1 as a whole.

According to the embodiment, in addition to the advantages provided by the first embodiment, since the first and second fitting structures 51 and 53 alternately couple the edge parts in the longitudinal direction of the stacking of the frames 15 (in other words, since the coupling between the frames 15 is in a so-called cantilever manner), the coupling strength at the coupling portions between the frames 15 can be unequal. In other words, a weak part can be provided in the coupling part. In this way, the flat laminate cells (accumulator cells) 5 can effectively be protected from externally applied impacts. More specifically, when an impact in more than a prescribed level is applied to the accumulator device 1, the weak part thus provided surely causes the frames 15 to be separated, and therefore the impact transmitted to the flat laminate cells (accumulator cells) 5 can effectively be reduced.

At the time, since the frames 15 are separated while they respectively accommodate and hold the flat laminate cells (accumulator cells) 5 (in other words, each in the state of module 65), the flat laminate cells (accumulator cells) 5 can effectively be protected from damages.

When the frames 15 are separated, the electrical connection between the flat laminate cells (accumulator cells) 5 is interrupted, the accumulator device 1 can have a fuse function without having to add a special component.

The electrode terminals of the accumulator device 1 and the modules 65 are in non-identical female and male forms by the fitting projections 50 and fitting recesses 52, and therefore a connection mistake at the time of mounting the accumulator device 1 in a vehicle or at the time of stacking the modules 65 can surely be prevented.

Furthermore, the fitting recesses 52 (for example as positive electrode terminals) are provided in the through holes 31 of the frames 15, and therefore electrode terminals in different polarities can surely be prevented from contacting each other, except for a proper fitting.

Figure 10:
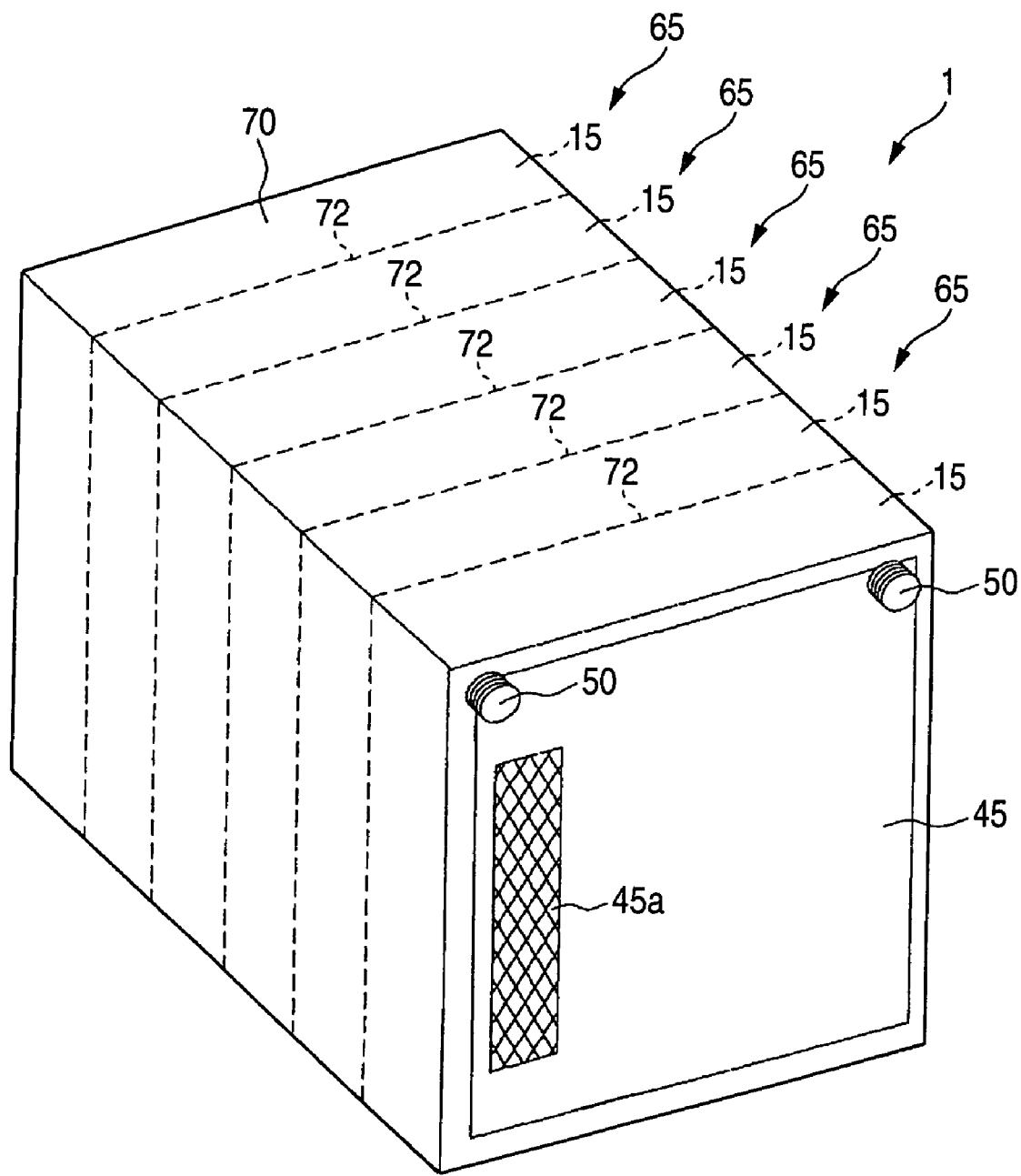
FIG. 10 is a perspective view of an accumulator device according to a third embodiment of the invention.
Figure 11:
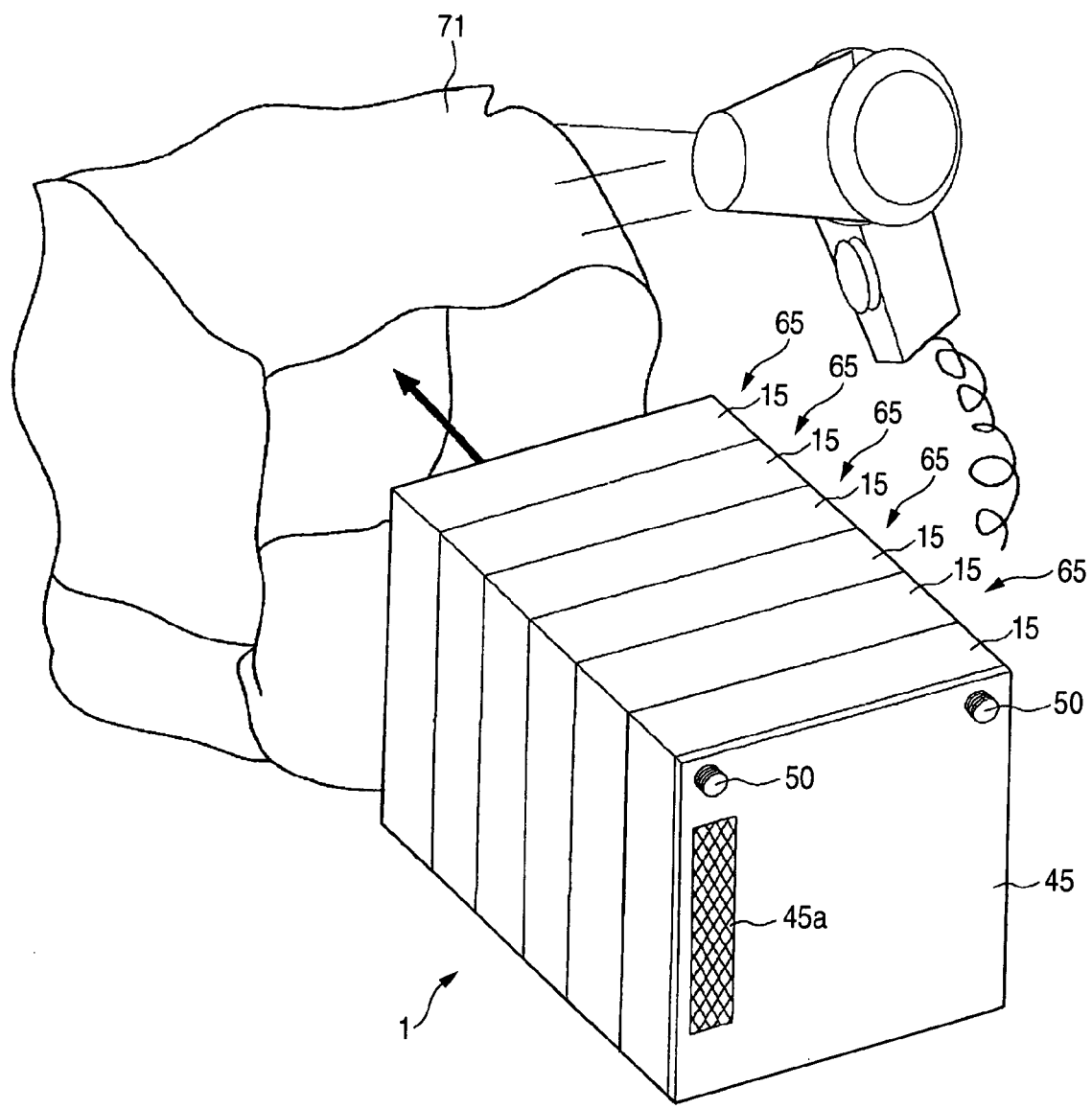
FIG. 11 is a perspective view of the accumulator device in FIG. 10 removed of a cover sheet according to the third embodiment.
Figure 12:
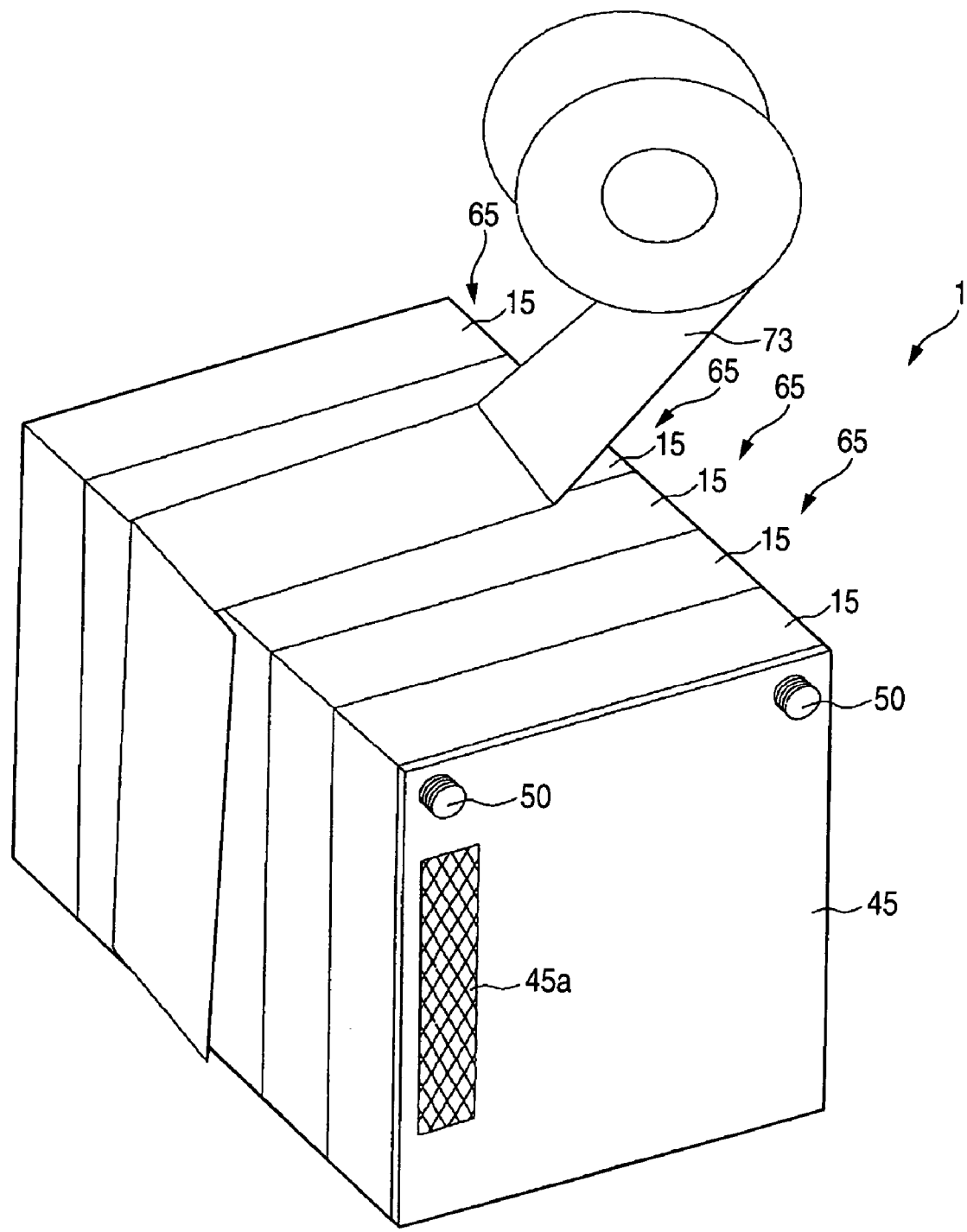
FIG. 12 is a perspective view of modifications of the accumulator device in FIG. 11 according to the third embodiment.
Figure 13:
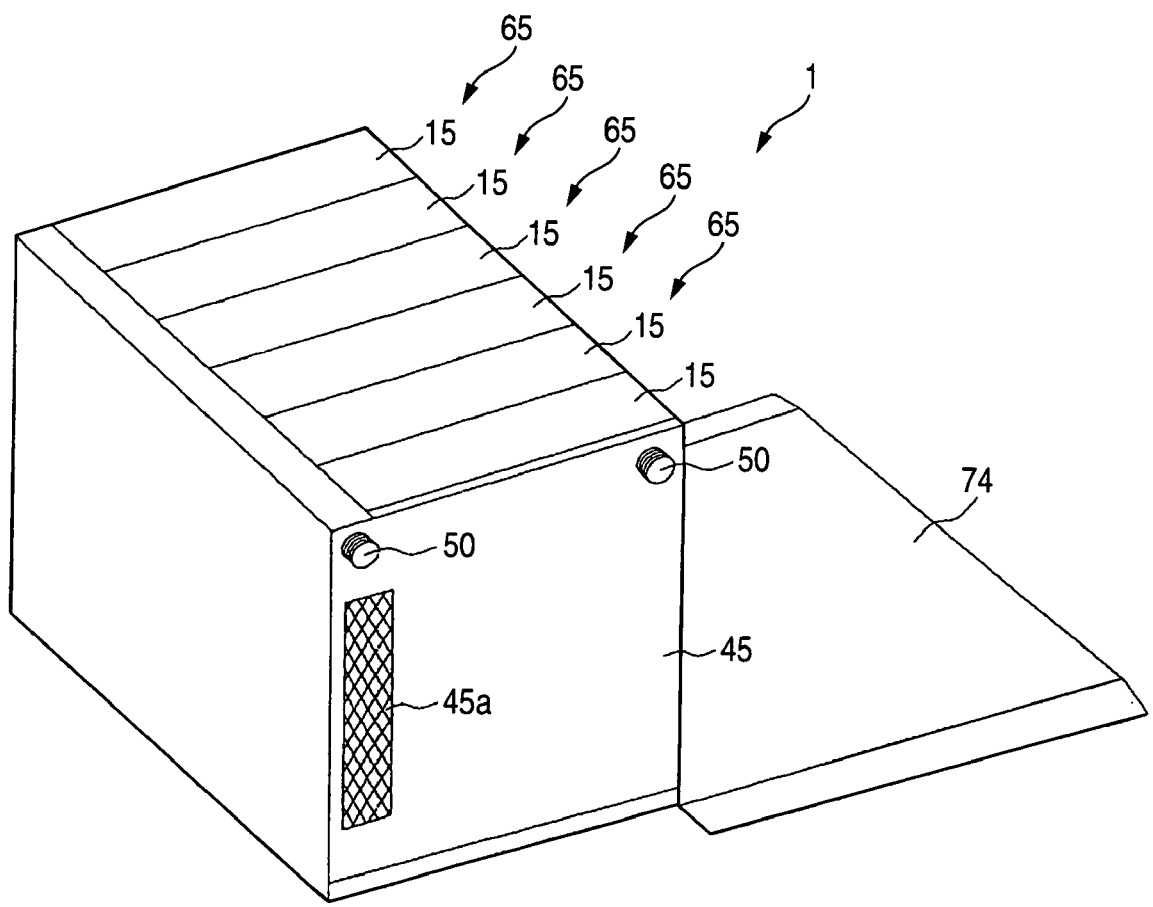
FIG. 13 is a perspective view of modifications of the accumulator device in FIG. 11 according to the third embodiment.

Now, a third embodiment of the invention will be described. FIGS. 10 to 13 relate to the third embodiment of the invention. FIG. 10 is a perspective view of an accumulator device, FIG. 11 is a perspective view of the accumulator device in FIG. 10 removed of the cover sheet, FIG. 12 is a perspective view of a modification of the accumulator device in FIG. 11, and FIG. 13 is a perspective view of another modification of the accumulator device in FIG. 11. Note that this embodiment is different from the second embodiment in that the coupling between the frames 15 is reinforced using a cover sheet 70. The other same parts will be denoted by the same reference characters and will not be described.

As shown in FIG. 10, in the embodiment, the outer periphery of the frames 15 stacked and coupled with each other is covered with the cover sheet 70. The cover sheet 70 is, for example, made of an annular heat-shrinkable sheet 71, and the sheet is thermally shrunk by heat from a blower-dryer or the like (see FIG. 11) to integrally cover the frames 15. The thermally shrunk cover sheet 70 integrally covers the frames 15, so that the coupling strength between the frames 15 is reinforced.

At the time, intermittent incisions 72 are provided in the cover sheet 70 along the coupling parts or the vicinity of the coupling parts of the frames 15, so that the coupling strength between the frames 15 may be adjusted as desired.

According to the embodiment, the coupling strength between the frames 15 coupled with one another may be reinforced by the cover sheet 70, so that the engagement groove 34 provided at the periphery of the fitting projection 50, and the double-faced adhesive tape 67 inserted between the abutment portions 18 and 19 may be omitted, which can simplify the coupling operation between the frames 15 and improve the productivity of the accumulator device 1.

Herein, in addition to the cover sheet 70 made of the thermally shrinkable sheet 71 described above, other kinds of cover sheets may be employed. For example, as shown in FIG. 12, an elongate adhesive sheet 73 to be wound around individual coupling parts at the outer periphery of the frames 15 may be provided as the cover sheet 70. Alternatively, as shown in FIG. 13, the cover sheet 70 may be made of an adhesive sheet 74 to be wrapped around the coupling parts altogether at the outer periphery of the frames 15.

Figure 14:
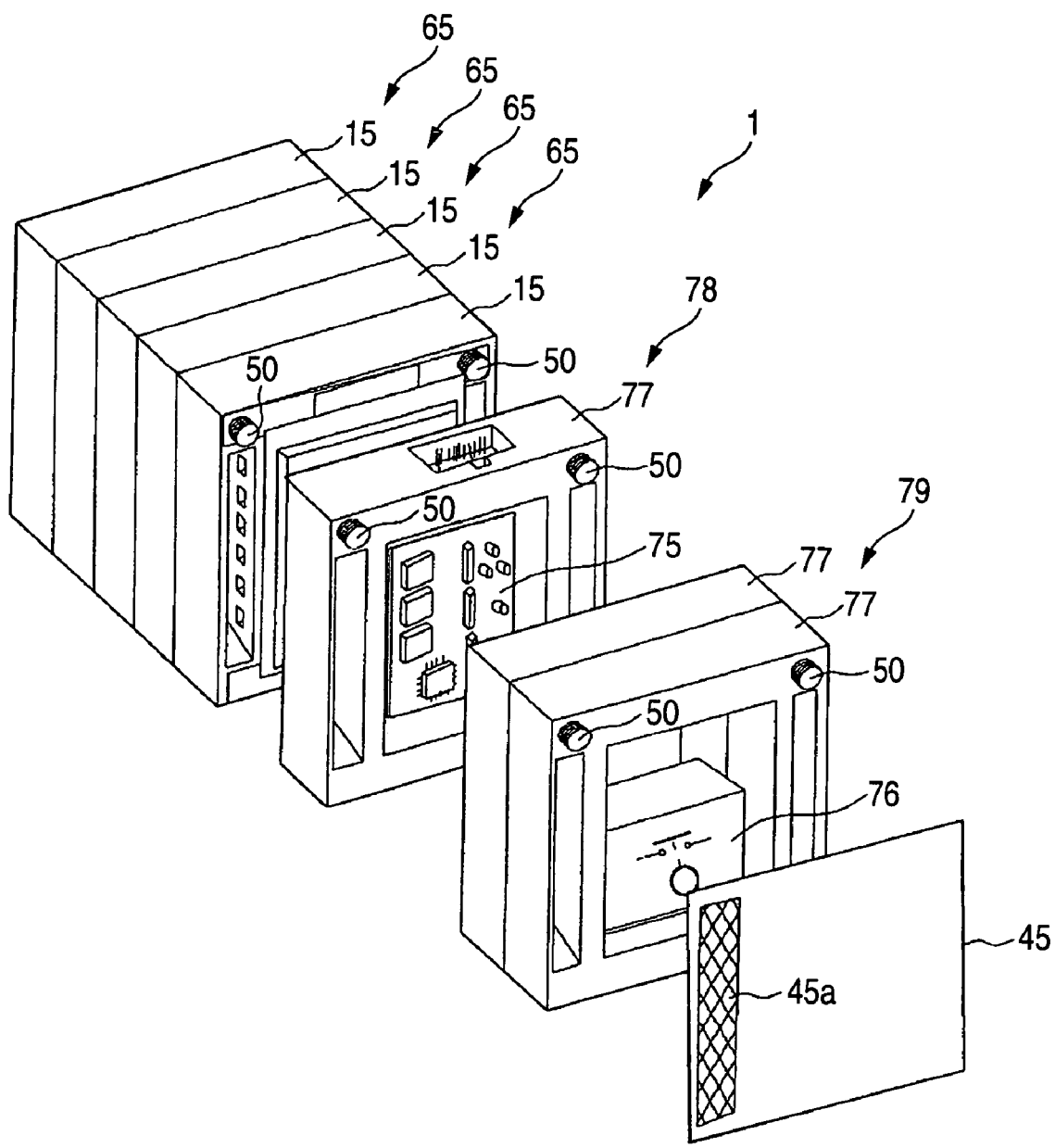
FIG. 14 is an exploded perspective view of an accumulator device according to a forth embodiment of the invention.

Now, a fourth embodiment of the invention will be described. FIG. 14 relates to the fourth embodiment of the invention. FIG. 14 is an exploded perspective view of an accumulator device. This embodiment is mainly different from the second embodiment in that accessories are additionally provided to the stacking of the modules 65. The other same parts will be denoted by the same reference characters and will not be described.

As shown in FIG. 14, the accumulator device 1 has, for example, layers of an electronic circuit 75 and a control device 76 as accessories at one end of the stacking of the modules 65.

More specifically, the electronic circuit 75 is, for example, a circuit to control the electric energy quantity of the flat laminate cells (accumulator cells) 5. The electronic circuit 75 is accommodated and held in an accessory accommodating frame 77 having substantially the same shape as the frame 15, so that an electronic circuit module 78 is formed.

The control device 76 includes, for example, a relay that controls the connection with a main power supply, and the control device 76 is accommodated and held in two accessory accommodating frames 77, so that a control device module 79 is formed.

The electronic circuit module 78 and the control device module 79 are sequentially placed on the terminal end of the layers of the modules 65 as they are placed and coupled through the frames 15, so that an accumulator device 1 integrally including the various kinds of accessories is formed.

According to the embodiment, the accessories associated with the accumulator cells 5 can efficiently be arranged using the frames 15.

Note that the invention is not limited to the embodiments described above and can be modified without departing from the scope of the invention. For example, the accumulator cell is not limited to the above-described flat laminate cell, and various kinds may be applied. In the above embodiments, the accumulator device is for use in a vehicle, but it is understood that the invention is not limited to the application. The above-described embodiments may be combined as desired.

What is claimed is:

1. An accumulator device comprising a plurality of substantially identical and flat frames,
   wherein each of said frames comprises:
   an accommodating portion that accommodates one of a plurality of accumulator cells;
   a first abutment portion on a first surface of each of the frames;
   a second abutment portion on a second surface of each of the frames;
   a first fitting structure on the first abutment portion; and
   a second fitting structure on the second abutment portion,
   wherein the plurality of frames are stacked by contacting adjacent frames of said plurality of frames by the first abutment portion of one of the adjacent frames and the second abutment portion of another of the adjacent frames, the adjacent frames being commonly mechanically coupled by fitting the first fitting structure of the one of the adjacent frames to the second fitting structure of the another of the adjacent frames, and
   wherein the first fitting structure comprises a fitting projection on a first end on a longitudinal surface of each of the frames, and the second fitting structure comprises a fitting recess on an opposite end on the same longitudinal surface of each of the frames, the plurality of frames being sequentially stacked so that the fitting projection on the one of the adjacent frames and the fitting projection on the another of the adjacent frames are alternately arranged into the recess
   wherein each of said frames comprises a first through hole at said first end having a first electrically conductive pin extending at least partially through said first through hole and defining said fitting projection, and a second through hole having a second electrically conductive pin extending at least partially through said second through hole and defining said fitting recess, and
   wherein said plurality of accumulator cells are electrically connected in series using said first and said second electrically conductive pins.

2. The accumulator device according to claim 1, wherein said one of said plurality of accumulator cells is held between the adjacent frames.

3. The accumulator device according to claim 1, wherein said one of said plurality of accumulator cells is a laminate cell, and
   a sealing portion of the laminate cell positioned in the accommodating portion is between the first abutment portion of the one of the adjacent frames and the second abutment portion of the another of the adjacent frames.

4. The accumulator device according to claim 1, wherein the first abutment portion and the second abutment portion are elastic members.

5. The accumulator device according to claim 1, wherein each frame further comprises a cooling passage structure, and
   when the plurality of frames are stacked, the cooling passage structures of the plurality of frames are connected to form a continuous cooling passage in a stacking direction of the frames.

6. The accumulator device according to claim 1, wherein a plurality of said accumulator cells are connected in series,
   each of the plurality of accumulator cells is individually accommodated in the accommodating portion of each frame, and
   the plurality of accumulator cells are arranged in a zigzag arrangement with respect to each other.

7. The accumulator device according to claim 1, wherein one electrode terminal of said one of said plurality of accumulator cells is electrically connected to the first fitting structure, and the other electrode terminal is electrically connected to the second fitting structure, so that said one of said plurality of accumulator cells and the frame constitute a module.

8. The accumulator device according to claim 1, further comprising a cover sheet at least externally covering coupling portions between the frames, and reinforcing the coupling portions.

9. The accumulator device according to claim 8, wherein the cover sheet is an annular heat-shrinkable sheet.

10. The accumulator device according to claim 8, wherein the cover sheet comprises intermittent incisions along one of the coupling portions and a vicinity of the coupling portions.

11. The accumulator device according to claim 1, further comprising an accessory accommodating frame that accommodates an accessory and has substantially the same shape as each of the frames,
    wherein the accessory accommodating frame is stacked on the plurality of frames.

* * * * *